UNITED STATES PATENT OFFICE

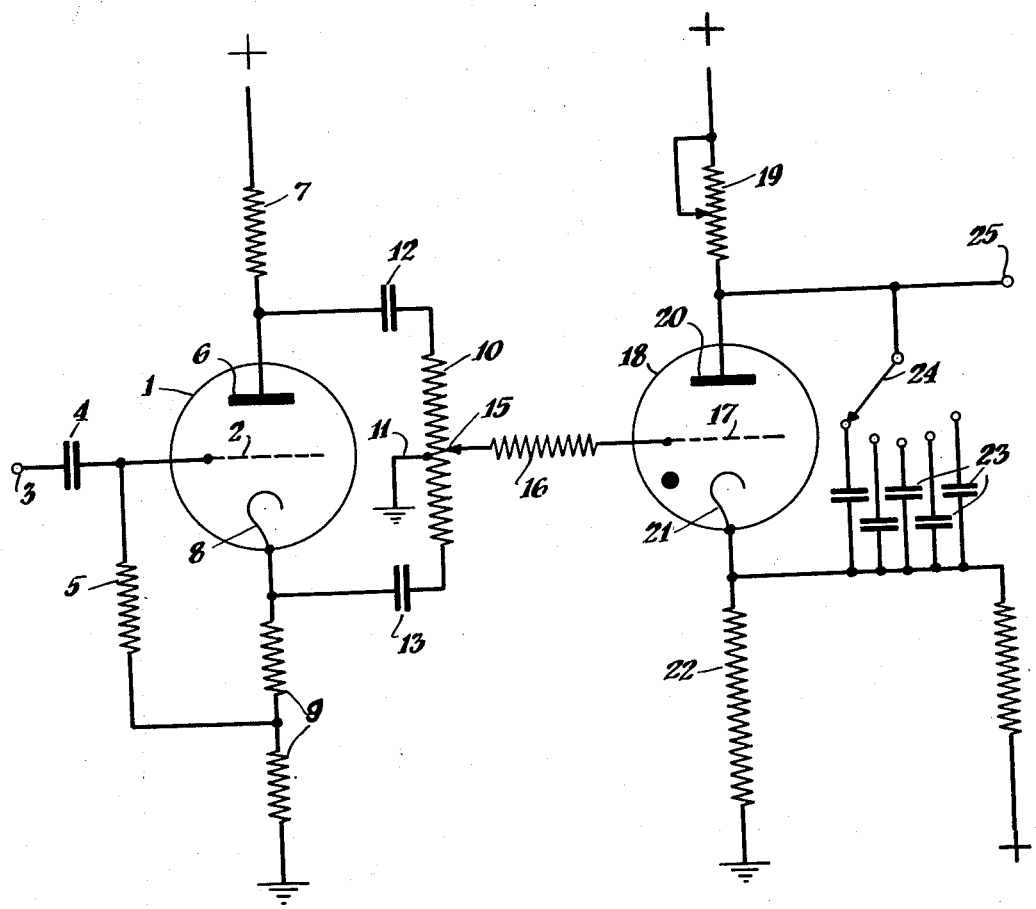

2,441,334

SIGNAL LEVEL AND PHASE CONTROL

William H. Sayer, Passaic, N. J., assignor to Allen B. Du Mont Laboratories, Inc., Passaic, N. J., a corporation of Delaware Application April 30, 1943, Serial No. 485,224

1 Claim. (Cl. 178—44)

This invention relates to a device for controlling the amplitude of an electrical signal from zero to a high potential in either the positive or negative direction. The invention is particularly useful in controlling test signals, synchronizing and sweep signals for oscillographs, for example, but it is not restricted to such uses.

In carrying out the invention the signal to be controlled is applied to a vacuum tube, which has its plate and cathode coupled to a resistance which is grounded preferably at its middle point and is provided with an adjustable contact at different points from zero potential to the maximum positive and negative potentials.

The invention will be understood from the description in connection with the accompanying drawing, in which the figure is a diagram of connections showing an embodiment of the invention.

In the drawing, reference character 1 indicates a vacuum tube to the grid 2 of which a signal is applied from the input terminal 3. The usual coupling condenser 4 and grid leak 5 are shown. Positive potential is applied to the plate 6 through resistance 7 and the cathode 8 is biased by resistance 9.

A resistance 10 is grounded at its midpoint 11 and the opposite ends thereof are coupled by condensers 12 and 13 to the plate 6 and cathode 8, respectively, thus constituting a potentiometer having a point at zero potential.

A sliding contact 15 is movable along the potentiometer 10 so zero potential as well as any desired positive and negative potentials can be taken off through resistance 16 to grid 17 of gas filled triode 18 having an adjustable resistance 19 in its plate circuit and having a cathode 21 biased by resistance 22. A number of condensers 23 of different sizes are adapted to be selectively conected between the plate 20 and cathode 21 by switch 24 so that the time constant of discharge of tube 18 can be suitably adjusted so as to obtain sawtooth waves of the desired frequencies at the output 25 in the known way.

The operation is as follows:

The synchronizing signal from any convenient source, not shown, is connected to the terminal 3 and fed to the grid 2 of amplifier tube 1. The plate load resistance 7 and cathode load or biasing resistance 9 of tube 1 are equal. The potentiometer 10 that has its ends capacitatively coupled to the plate 6 and cathode 8, respectively, has its center grounded so that by adjustment of the contact 15 a gain control for either phase of the signal is made available so that the sawtooth sweep generating device to which it is connected can always be triggered by a positive signal whether a positive or negative signal is fed to the amplifier for the synchronizing signal.

What is claimed is:

A device for varying the amplitude and controlling the polarity of an electrical signal, which comprises a vacuum tube having equal resistors respectively in series with its plate and cathode, said plate resistor being connected to a source of positive potential and said cathode being connected to ground, a potentiometer grounded intermediate its ends, a condenser coupling one end of said potentiometer to said plate, a condenser of the same size coupling the other end of said potentiometer to said cathode and a sliding contact for said resistor adapted to be moved along said potentiometer onto and along opposite sides of its grounded point.

WILLIAM H. SAYER.

REFERENCES CITED

The following references are of record in the file of this patent:

UNITED STATES PATENTS

| Number | Name | Date |
|---|---|---|
| 1,933,219 | Nakajima et al. | Oct. 31, 1933 |
| 2,118,977 | Lewis et al. | May 31, 1938 |
| 2,165,770 | Tolson | June 11, 1939 |
| 2,271,876 | Seeley | Feb. 3, 1942 |
| 2,353,672 | Keck et al. | July 18, 1944 |